United States Patent
Shingu

(10) Patent No.: US 11,184,413 B2
(45) Date of Patent: Nov. 23, 2021

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Jun Shingu, Tokyo (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/987,513

(22) Filed: Aug. 7, 2020

(65) Prior Publication Data

US 2021/0218783 A1 Jul. 15, 2021

(30) Foreign Application Priority Data

Jan. 10, 2020 (JP) .............................. JP2020-003226

(51) Int. Cl.
- *G06F 15/177* (2006.01)
- *H04L 29/06* (2006.01)
- *H04L 29/08* (2006.01)
- *H04L 12/24* (2006.01)

(52) U.S. Cl.
CPC ...... *H04L 65/1073* (2013.01); *H04L 41/0893* (2013.01); *H04L 67/18* (2013.01); *H04L 67/22* (2013.01)

(58) Field of Classification Search
CPC . H04L 65/1073; H04L 41/0893; H04L 67/18; H04L 67/22
See application file for complete search history.

(56) References Cited

U.S. PATENT DOCUMENTS

| | | | |
|---|---|---|---|
| 2002/0062367 A1 | 5/2002 | Debber et al. | |
| 2005/0235061 A1 | 10/2005 | Debber et al. | |
| 2015/0180815 A1* | 6/2015 | Zhou | H04L 51/14 709/206 |
| 2019/0109917 A1* | 4/2019 | Milanese | H04M 1/00 |
| 2020/0241493 A1* | 7/2020 | Milevschi | G05B 19/042 |

FOREIGN PATENT DOCUMENTS

| | | |
|---|---|---|
| JP | 2003-532953 A | 11/2003 |
| JP | 2006-18407 A | 1/2006 |
| JP | 4954467 B2 | 6/2012 |

* cited by examiner

*Primary Examiner* — Wing F Chan
*Assistant Examiner* — Joseph R Maniwang
(74) *Attorney, Agent, or Firm* — Oliff PLC

(57) ABSTRACT

An information processing apparatus includes a processor. The processor is configured to associate plural terminals with a service, the plural terminals being registered for the service and located within a predetermined range, set, based on use statuses of the plural terminals located within the predetermined range, priority levels for the plural terminals, and transmit a notification regarding the service to a terminal with the highest priority level.

14 Claims, 11 Drawing Sheets

| COUNTER ID | IDENTIFICATION ID | PRIORITY LEVEL | PRIORITY GROUP | LOCATION | STATUS |
|---|---|---|---|---|---|
| 1 | 1 | 3.7 | A | SHOP | ARRIVED THREE MINUTES AGO |
| | 2 | 1.5 | B | 3 km | NO TRAVELLING |
| | 3 | 3.2 | A | 500 m | APPROACHING |
| 2 | NO REGISTRATION | — | — | — | — |

FIG. 3

| COUNTER ID | IDENTIFICATION ID | PRIORITY LEVEL | PRIORITY GROUP |
|---|---|---|---|
| 1 | 1 | 3.7 | A |
|   | 2 | 1.5 | B |
|   | 3 | 3.2 | A |

~4

| COUNTER ID | IDENTIFICATION ID | PRIORITY LEVEL | PRIORITY GROUP | LOCATION | STATUS |
|---|---|---|---|---|---|
| 1 | 1 | 3.7 | A | SHOP | ARRIVED THREE MINUTES AGO |
| | 2 | 1.5 | B | 3 km | NO TRAVELLING |
| | 3 | 3.2 | A | 500 m | APPROACHING |
| 2 | NO REGISTRATION | — | — | — | — |

| IDENTIFICATION ID | NAME | ADDRESS | TELEPHONE NUMBER | COUNTER ID |
|---|---|---|---|---|
| 1 | USER A | SHINJUKU WARD, TOKYO ... | 03-1234-5678 | 1 |
| 2 | USER B | KAWAGUCHI CITY, SAITAMA PREFECTURE ... | 048-123-4567 | 1 |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-003226 filed Jan. 10, 2020.

BACKGROUND

(i) Technical Field

The present disclosure relates to an information processing apparatus and a non-transitory computer readable medium.

(ii) Related Art

In Japanese Unexamined Patent Application Publication (Translation of PCT Application) No. 2003-532953, a computer implementation method for managing a task is disclosed. The computer implementation method includes a step of accessing a first server from a client, a step of extracting, by the first server, status information associated with a task stored in a database and displaying the extracted status information on the client, a step of receiving an instruction for managing the task, a step of generating update information regarding the status information in response to the received instruction, and a step of supplying the status information as updated status information and displaying the supplied status information on the client.

In Japanese Patent No. 4954467, a notification user state management apparatus is disclosed. The notification user state management apparatus includes a user internal state estimation unit that estimates, based on an observable state element represented by at least one of a user operation state representing a state of an operation of a user, a task state representing an operation state of the user on an information display terminal, and a close observation state representing whether or not there is a line of sight of the user on the information display terminal, an internal state of the user represented by at least one of an information recognition degree representing the degree at which the user of the information display terminal recognizes contents of information and a task interruption degree representing the degree at which a task being executed by the user of the information display terminal is interrupted by notification of information, and a user notification effect estimation unit that estimates, based on the internal state of the user estimated by the user internal state estimation unit, the degree of effect on the user of the information display terminal that is to receive information in the case where the information is notified. The user notification effect estimation unit calculates, based on the internal state of the user, an expected utility value representing effect expected in the case where the information is notified. A determination as to whether or not to notify the information is made based on the expected utility value calculated by the user notification effect estimation unit.

In Japanese Unexamined Patent Application Publication No. 2006-18407, an access recording and notification system in which information indicating that a person who is to be looked after such as a child or an aged person has entered a facility such as a tutoring school, a school, or an elderly care home or information indicating that the person who is to be looked after has exited from the facility is notified to a notification destination terminal via a computer apparatus is disclosed. The computer apparatus includes reading means for reading ID information for identifying the person who is to be looked after and address information of the notification destination terminal, image capturing means for capturing an image of the person who is to be looked after entering or exiting from the facility, notification file creating means for creating, based on data of an image file created by the image capturing means and the ID information and the address information read by the reading means, a notification file to be transmitted to the notification destination terminal, and transmitting means for transmitting the notification file to the notification destination terminal.

SUMMARY

In the case where there are a plurality of terminals that may receive a notification regarding a service, if the notification is transmitted to all the terminals, users of the service are troubled. In contrast, if the notification is transmitted only to part of the plurality of terminals, it is unclear which terminal is highly likely to check the notification.

Aspects of non-limiting embodiments of the present disclosure relate to providing an information processing apparatus and a non-transitory computer readable medium that are able to transmit, in a case where there are a plurality of terminals that may receive a notification regarding a service, the notification to a terminal that is highly likely to check the notification out of the plurality of terminals.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor. The processor is configured to associate a plurality of terminals with a service, the plurality of terminals being registered for the service and located within a predetermined range, set, based on use statuses of the plurality of terminals located within the predetermined range, priority levels for the plurality of terminals, and transmit a notification regarding the service to a terminal with the highest priority level.

BRIEF DESCRIPTION OF THE DRAWINGS

Exemplary embodiments of the present disclosure will be described in detail based on the following figures, wherein:

FIG. 3 is a diagram illustrating an example of a management table;

DETAILED DESCRIPTION

Hereinafter, exemplary embodiments of the present disclosure will be described with reference to drawings. The same component elements and the same processes are referred to with the same reference signs throughout the drawings, and redundant explanation will not be provided.

Figure 1:
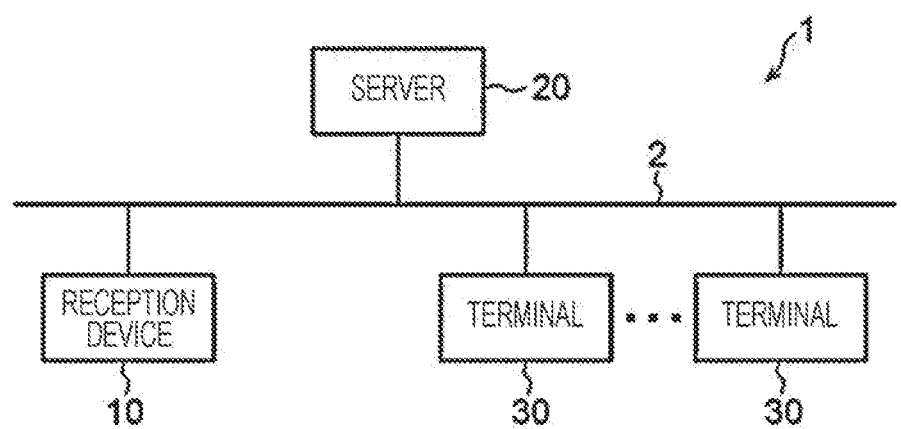
FIG. 1 is a diagram illustrating an example of the system configuration of an information processing system.

FIG. 1 is a diagram illustrating an example of the system configuration of an information processing system 1 according to an exemplary embodiment. As illustrated in FIG. 1, the information processing system 1 includes a reception device 10, a server 20, and a plurality of terminals 30. The reception device 10, the server 20, and the plurality of terminals 30 are connected to one another via a communication line 2.

The reception device 10 is installed at a service base where a service is provided and receives a user who wishes to use the service.

There is no constraint on the type of a service to be provided to a user in an exemplary embodiment. For example, any service such as a medical care service at a hospital and a food-serving service at a restaurant may be provided in an exemplary embodiment. Furthermore, the service may be charged or free of charge. However, in an exemplary embodiment, a service is not a service that is provided via the communication line 2 such as video distribution but is a service that is provided to a user who is at a service base where the service is provided. Hereinafter, a service base where a service is provided will be called a "shop".

When completing an operation for receiving a user, the reception device 10 cooperates with the server 20 to issue a counter ID associated with a service requested by the user, so that a notification indicating completion of the reception of the user will be transmitted. The counter ID may be any information in which the user and the service are associated with each other. For example, a reception number indicating the order of reception for the service, a reception time for the service, or the like may be used as the counter ID.

The user to whom the counter ID has been issued may wait in a place away from the shop until the service starts to be provided.

There is no constraint on the number of reception devices 10 included in the information processing system 1. The information processing system 1 may include a plurality of reception devices 10. Hereinafter, however, explanation will be provided by attention being paid to one of the plurality of reception devices 10. As described above, the reception device 10 may be installed in a shop. However, the reception device 10 may be installed in a place away from a shop.

The user may acquire the counter ID from a web page of the shop instead of at the reception device 10, which is installed physically independently. However, in such a case, a web server that provides the web page, which is not illustrated in FIG. 1, is an example of the reception device 10.

The server 20 manages a reception state of a service at the reception device 10 and notifies the reception device 10 of a counter ID. The server 20 also manages association between a terminal 30 being used by a user and a counter ID. Specifically, when a user causes a terminal 30 carried by the user to read a counter ID issued by the reception device 10, the terminal 30 notifies the server 20 of the read counter ID and an identification ID for uniquely identifying the terminal 30 that has read the counter ID in association with each other. Accordingly, an identification ID is associated with each counter ID. Thus, terminals 30 of users and counter IDs are managed in association with each other.

The identification ID may be identification information of any type that is able to uniquely identify a terminal 30. For example, an e-mail address or a social networking service (SNS) account set for the terminal 30, a manufacture's serial number of the terminal 30, an internet protocol (IP) address, or a media access control (MAC) address may be used as the identification ID. Furthermore, in the case where association between a user ID uniquely allocated to a user and a terminal 30 used by the user is set in advance, the user ID input by the user when the user uses the terminal 30 is also an example of the identification ID.

The server 20 registers, for each service, a counter ID in a queue. When the turn for the service approaches, the server 20 performs a call for a user to at least one of terminals 30 that are managed in association with the counter ID (hereinafter, referred to as "terminals 30 registered for a counter ID"). That is, a call for a user represents a notification transmitted to a user indicating that a service is ready to be provided at a shop and the user is requested to come to the shop. The call for a user is an example of a notification regarding a service. The user who is using the terminal 30 that receives the call will be provided with the service at the shop.

The number of users who cause their terminals 30 to read a counter ID is not necessarily one. In the case where a group of users wishes to receive a service, individual users belonging to the group may cause their terminals 30 to read the same counter ID and register the individual terminals 30 for the counter ID so that any terminal 30 in the group is able to receive a call for a user from the server 20. Furthermore, in the case where a user who wishes to use a service is a child, parents of the child may worry about the child himself/herself using the service. Thus, the parents may also want to receive a notification regarding the service. In such a case, a child and his/her parent may cause their terminals 30 to read the same counter ID and register their terminals 30 for the counter ID. Hereinafter, an example in which a plurality of terminals 30 are registered for the same counter ID will be described.

The terminals 30 may be any information devices that are able to receive a notification regarding a service transmitted from the server 20 via the communication line 2. For example, smartphones, tablet computers, wearable devices, or the like may be used as the terminals 30. The terminals 30 may be desktop computers that are assumed not to be carried by users. However, users who move to a shop carry portable information devices as the terminals 30.

There is no constraint on the type of communication protocol used for the communication line 2 of the information processing system 1. Furthermore, the communication line 2 may be a wired line, a wireless line, or a mixture of wired and wireless lines. Moreover, the communication line 2 may be a dedicated line or a public line shared among an unspecified number of users, such as the Internet.

Figure 2:
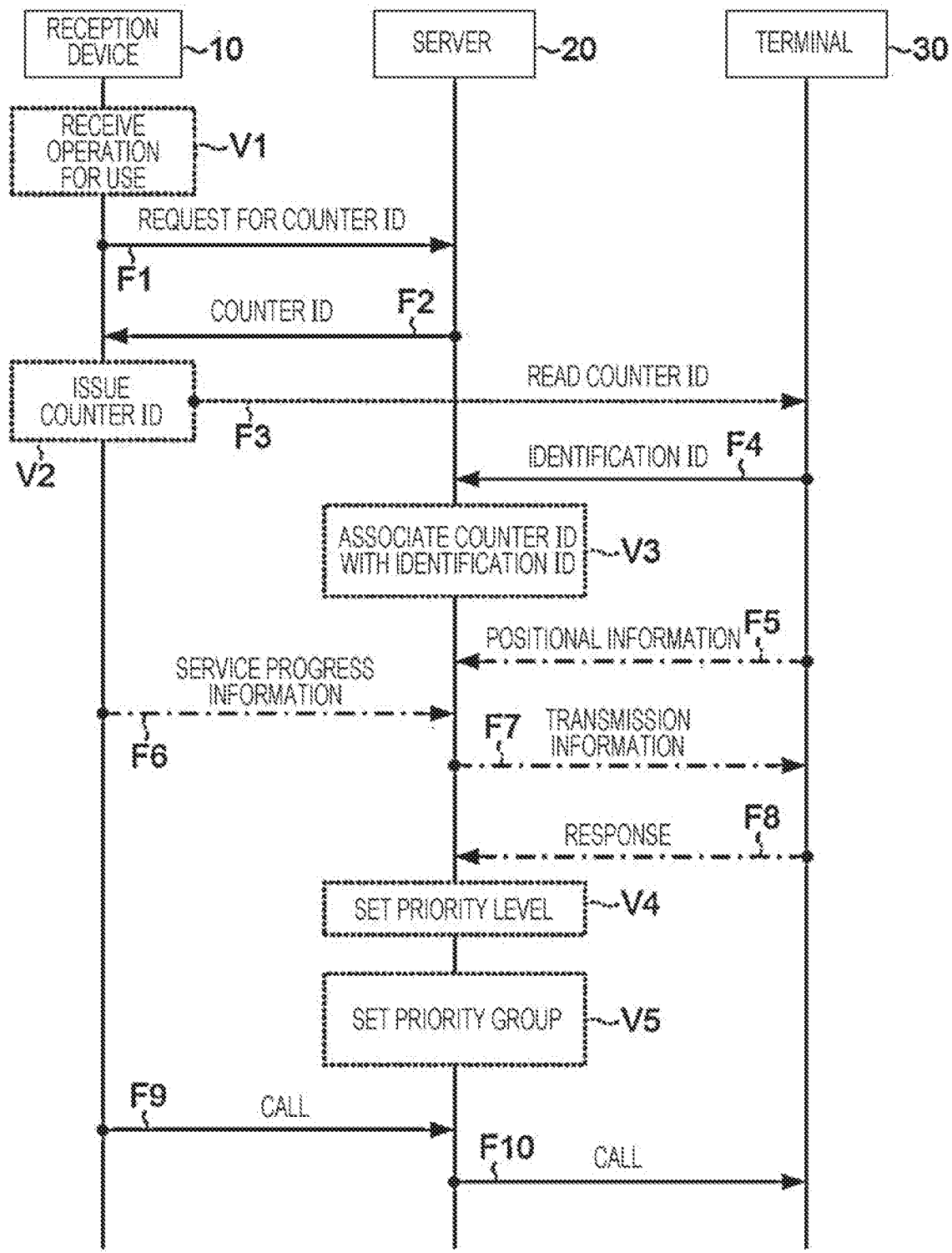
FIG. 2 is a sequence diagram illustrating an example of the flow of information in the information processing system.

FIG. 2 is a sequence diagram illustrating an example of the flow of information exchanged in the information processing system 1. For convenience of explanation, in the sequence diagram of FIG. 2, the flow of information is illustrating by attention being paid to one of the plurality of terminals 30. In actuality, however, the flow of information illustrated in FIG. 2 is generated for the plurality of terminals 30.

First, a user performs an operation for reception to use a service at the reception device 10 (FIG. 2: V1).

The reception device 10 that has received the operation for use of the service requests the server 20 for a counter ID (FIG. 2: F1).

The server 20 that has received the request for a counter ID issues, as a counter ID, a reception number that is not the same as any reception numbers issued previously, and registers the issued counter ID in a queue for the service that is provided for the corresponding reception device 10. Then, the server 20 notifies the reception device 10, which is a request source for the counter ID, of the issued counter ID (FIG. 2: F2).

The reception device 10 that has received the counter ID from the server 20 issues the counter ID to the user (FIG. 2: V2). As a method for issuing a counter ID, for example, a method for printing a bar code representing the counter ID on paper is used. However, the reception device 10 may transmit, via the communication line 2, the bar code to the terminal 30 that has performed the operation for reception to use the service at the reception device 10. Transmission destination information of the counter ID may be registered in the reception device 10 when the user performs the operation for reception to use the service. Furthermore, a counter ID is not necessarily represented by a bar code. A counter ID may be represented by characters so that a user is able to visually recognize the counter ID.

The user causes the terminal 30 to read the counter ID by causing a camera built in the terminal 30 to read the bar code (FIG. 2: F3). Other users also cause their terminals 30 to read the same counter ID by causing cameras of the terminals 30 to read the bar code.

In the case where a bar code is transmitted to a terminal 30 of a user, the user who is using the terminal 30 to which the bar code has been transmitted causes the terminal 30 to read a counter ID by causing the bar code to be displayed on the screen of the terminal 30. Other users to which a bar code has not been transmitted cause their terminals 30 to read the same ID by causing cameras of the terminals 30 to read a bar code displayed on the screen.

The reception device 10 does not necessarily print a bar code representing a counter ID on paper. For example, a user may cause his/her terminal 30 to read a bar code representing a uniform resource locator (URL) of a web page and acquire a counter ID from the displayed web page. Furthermore, a terminal 30 that has read a counter ID or a URL may transmit the counter ID or URL to terminals 30 of users belonging to a group that includes the terminal 30 via an SNS or the like so that the individual terminals 30 are able to read the same counter ID.

In the case where a user directly acquires a counter ID from a web page of a shop provided by a web server, which is not illustrated in FIG. 1, other users who have not acquired the counter ID from the web page of the shop may cause the web page of the shop to be displayed on their terminals 30 and input the acquired counter ID into the web page, so that the terminals 30 are able to read the same counter ID.

In the case where a counter ID is represented by characters, a user may input the characters representing the counter ID, so that the terminal 30 is able to read the counter ID.

The terminal 30 that has read the counter ID transmits the counter ID and an identification ID to the server 20 (FIG. 2: F4).

The server 20 that has received the counter ID and the identification ID manages the counter ID and the identification ID in association with each other (FIG. 2: V3). Specifically, the server 20 manages association between the counter ID and the identification ID in a management table 4.

FIG. 3 is a diagram illustrating an example of the management table 4. The management table 4 includes a counter ID column, an identification ID column, a priority level column, and a priority group column. Contents in these columns are associated with one another in the row direction. In the example of the management table 4 illustrated in FIG. 3, three terminals 30 with identification IDs "1", "2", and "3" are associated with a service with a counter ID "1".

Priority levels of terminals 30 represented by identification IDs are set in the priority level column in the management table 4. The priority levels of the terminals 30 represent values indicating to which terminal 30 out of the terminals 30 associated with the counter ID a notification regarding a service is to be transmitted preferentially. The server 20 transmits a notification regarding a service preferentially to a terminal 30 with a higher priority level. Priority level is represented by a numerical value. A terminal 30 for which a larger value is set in the priority level column is a terminal with a higher priority level. In the example of the management table 4 illustrated in FIG. 3, the priority level for the terminal 30 with the identification ID "1" is 3.7, the priority level for the terminal 30 with the identification ID "2" is 1.5, and the priority level for the terminal 30 with the identification ID "3" is 3.2. Thus, the priority level for the terminal 30 with the identification ID "1" is the highest among the three terminals 30.

A priority group to which a terminal 30 represented by an identification ID belongs is set in the priority group column in the management table 4. The server 20 categorizes the terminals 30 into a plurality of priority groups according to the priority levels of the terminals 30. In the priority group column in the management table 4, a priority group into which each terminal 30 is categorized is set.

At the point in time when the server 20 associates a counter ID with an identification ID, it is unclear to which terminal 30 a notification regarding a service is to be preferentially transmitted. Thus, the server 20 may set the same priority level for all the terminals 30 or the server 20 may not set priority level.

Items included in the management table 4 are not limited to the counter ID, the identification ID, the priority level for terminals 30, and the priority group. Other items may be included in the management table 4.

After reading the counter ID, the terminal 30 transmits positional information of the terminal 30 to the server 20 (FIG. 2: F5). The terminal 30 transmits positional information not only once but periodically or, every time a predetermined situation occurs, for example, every time the terminal 30 moves five meters, to the server 20.

In the meantime, while the user is waiting for his/her turn for the service, the service for other counter IDs is being provided at the shop. Thus, the reception device 10 sequentially transmits service progress information indicating a service progress status to the server 20 (FIG. 2: F6).

The server 20 transmits various notifications regarding the service based on the received service progress information to the terminal 30 (FIG. 2: F7). The various notifications include, for example, the number of people who are waiting for the service and the estimated waiting time. Furthermore, in addition to the notifications regarding the service, in order to increase the degree of satisfaction of the user during the waiting time, for example, the server 20 may transmit a video with a length corresponding to the waiting time to the terminal 30. The above-mentioned information transmitted from the server 20 to the terminal 30 will be collectively referred to as "transmission information".

The user who has noticed reception of the transmission information from the server 20 operates the terminal 30 to check the transmission information and transmits a response corresponding to contents of the transmission information to the server 20 (FIG. 2: F8). The response is not limited to a reply to the transmission information. The response includes information voluntarily transmitted from the terminal 30 to the server 20, such as a request for update the waiting time.

Timings of transmission of positional information (FIG. 2: F5), transmission of service progress information (FIG. 2: F6), transmission of transmission information (FIG. 2: F7), and transmission of a response (FIG. 2: F8), which are represented by one-dot chain line arrow, are not necessarily in accordance with the sequence illustrated in FIG. 2. For example, prior to transmission of positional information by the terminal 30, the reception device 10 may transmit service progress information. Furthermore, positional information, service progress information, transmission information, and a response may be transmitted a plurality of times.

The server 20 sets the priority level for the terminal 30 in accordance with a reaction by the user who is using the terminal 30, the reaction being represented by positional information and a response received from the terminal 30 (FIG. 2: V4). A method for setting the priority level for the terminal 30 will be described later in detail.

The server 20 sets a priority group to which the terminal 30 belongs in accordance with the set priority level (FIG. 2: V5).

In the case where provision of the service proceeds at the shop and the turn for the service corresponding to the counter ID has arrived, the reception device 10 transmits a notification indicating the counter ID to which the service is to be provided and a call for a user (FIG. 2: F9).

The server 20 that has received the call for a user from the reception device 10 identifies, in accordance with the priority levels of the terminals 30, a terminal 30 to which a call for a user is to be preferentially performed from among the terminals 30 associated with the counter ID notified from the reception device 10 along with the call for a user. Then, the server 20 performs the call for a user to the identified terminal 30 (FIG. 2: F10). Accordingly, the user of the terminal 30 is notified that the turn for the service has arrived, and the user is able to receive the service at the shop. Hereinafter, a terminal 30 to which a notification regarding a service is preferentially transmitted may be referred to as a "terminal 30 concerned".

In the case where the server 20 associates a service with a terminal 30 by associating a counter ID with an identification ID, the server 20 may treat terminals 30 located within a predetermined range in which users of terminals 30 are regarded as acting together (group range) as a group, and may associate identification IDs of the terminals 30 in the group with the counter ID. Thus, in the case where a plurality of terminals 30 located within the group range are regarded as a group, the server 20 identifies at least one or more terminals 30 concerned for each group.

Next, an example of the configuration of a principal part of an electrical system in the reception device 10 will be described.

Figure 4:
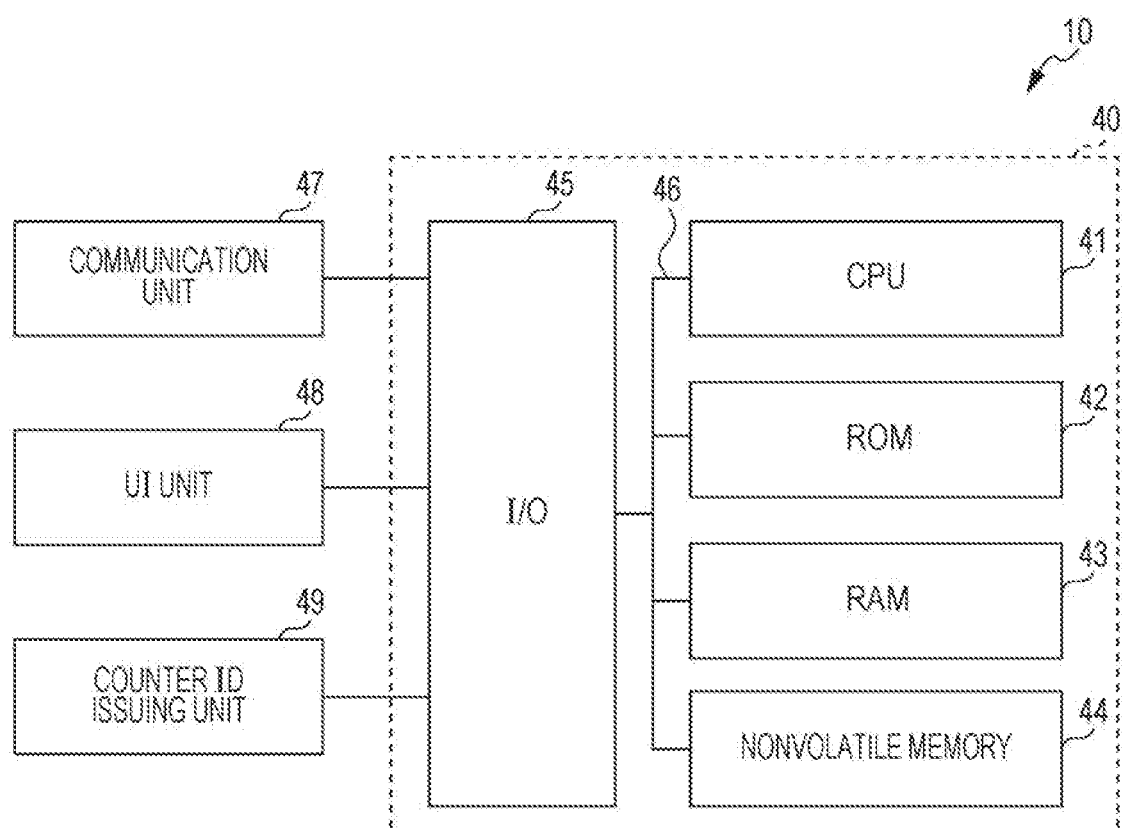
FIG. 4 is a diagram illustrating an example of the configuration of a principal part of an electrical system in a reception device.

FIG. 4 is a diagram illustrating an example of the configuration of a principal part of an electrical system in the reception device 10. The reception device 10 includes, for example, a computer 40.

The computer 40 includes a central processing unit (CPU) 41 that controls processing of the reception device 10, a read only memory (ROM) 42 that stores a reception program for causing the computer 40 to function as the reception device 10, a random access memory (RAM) 43 that is used as a temporary operation region of the CPU 41, a nonvolatile memory 44, and an input/output interface (I/O) 45. The CPU 41, the ROM 42, the RAM 43, the nonvolatile memory 44, and the I/O 45 are connected to one another via a bus 46.

The nonvolatile memory 44 is an example of a memory device in which stored information is maintained even when electric power supplied to the nonvolatile memory 44 is interrupted. For example, a semiconductor memory is used as the nonvolatile memory 44. However, the nonvolatile memory 44 may be a hard disk. The nonvolatile memory 44 is not necessarily built in the computer 40. The nonvolatile memory 44 may be, for example, a portable memory device that is removable from the computer 40.

For example, a communication unit 47, a user interface (UI) unit 48, and a counter ID issuing unit 49 are connected to the I/O 45.

The communication unit 47 is connected to the communication line 2. The communication unit 47 includes a communication protocol for performing data communication with the server 20 and the terminals 30 that are connected to the communication line 2, and an external device such as a file service, which is not illustrated in FIG. 1.

The UI unit 48 is a unit that provides an interface between the reception device 10 and users. The UI unit 48 notifies the CPU 41 of an instruction received from a user and notifies a user of information processed by the CPU 41. To receive an instruction from a user, the UI unit 48 includes an input device such as a button and a touch panel. To notify a user of processed information, the UI unit 48 includes an output device such as a light emitting diode (LED) and a liquid crystal display.

The counter ID issuing unit 49 is a unit that prints a counter ID on paper. The reception device 10 may cause a counter ID to be displayed on the liquid crystal display of the UI unit 48. In this case, the UI unit 48 functions as the counter ID issuing unit 49, without the counter ID issuing unit 49 being provided.

Figure 5:
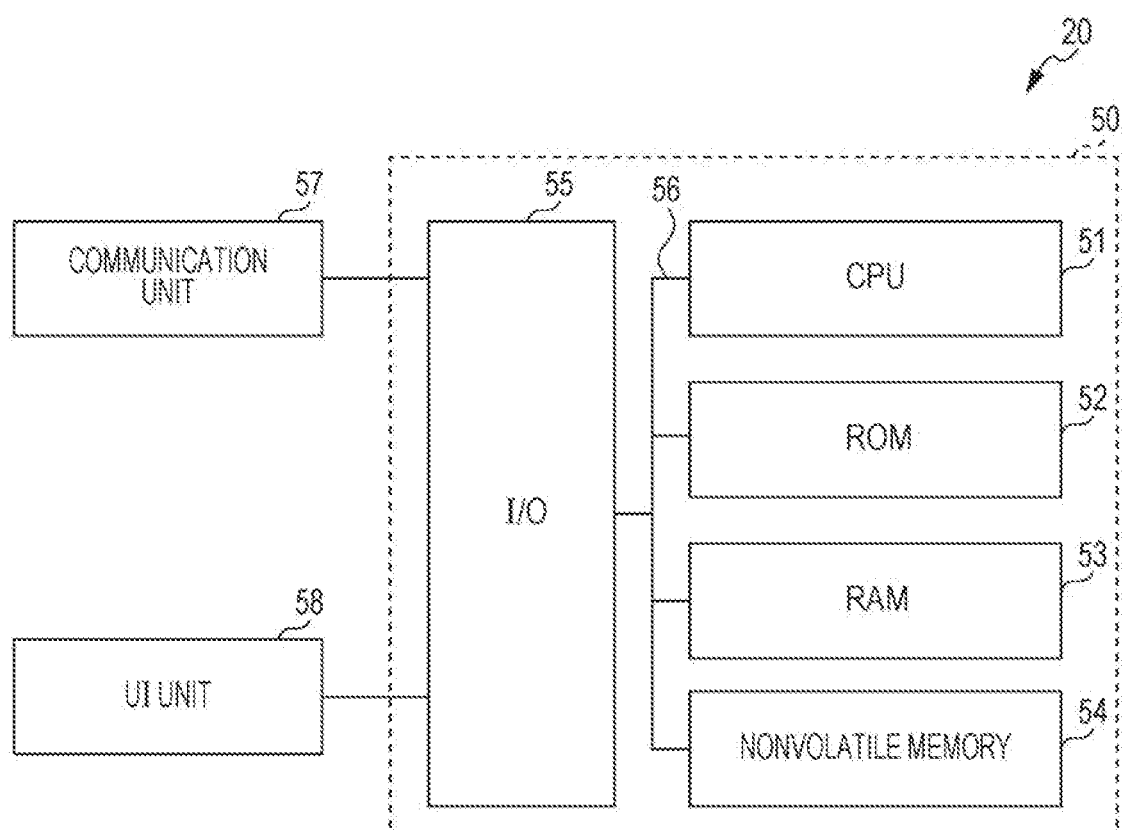
FIG. 5 is a diagram illustrating an example of the configuration of a principal part of an electrical system in a server.

FIG. 5 is a diagram illustrating an example of the configuration of a principal part of an electrical system in the server 20. The server 20 includes, for example, a computer 50.

The computer 50 includes a CPU 51 that controls processing of the server 20, a ROM 52 that stores an information processing program for causing the computer 50 to function as the server 20, a RAM 53 that is used as a temporary operation region of the CPU 51, a nonvolatile memory 54, and an I/O 55. The CPU 51, the ROM 52, the RAM 53, the nonvolatile memory 54, and the I/O 55 are connected to one another via a bus 56.

For example, a communication unit 57 and a UI unit 58 are connected to the I/O 55. Functions of the communication unit 57 and the UI unit 58 are the same as the functions of the communication unit 47 and the UI unit 48 in the reception device 10. Thus, explanation for the functions of the communication unit 57 and the UI unit 58 will be omitted.

Figure 6:
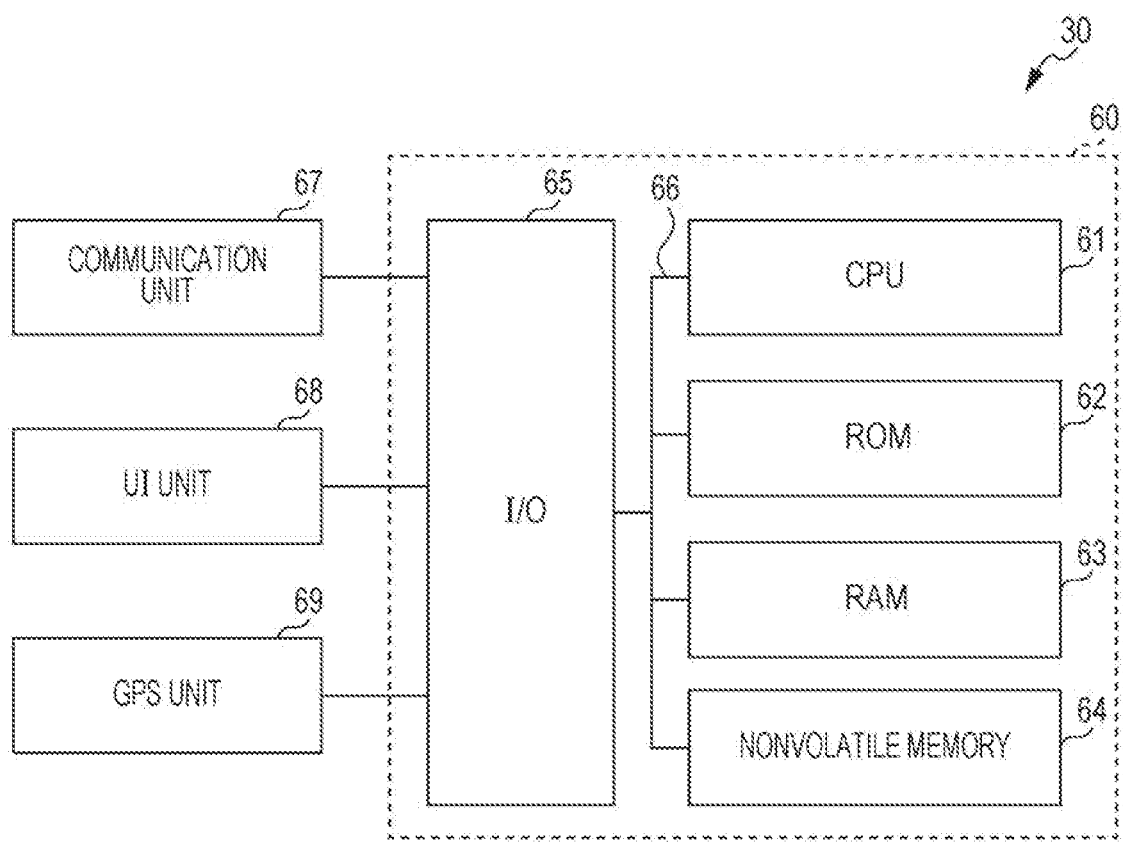
FIG. 6 is a diagram illustrating an example of the configuration of a principal part of an electrical system in a terminal.

FIG. 6 is a diagram illustrating an example of the configuration of a principal part of an electrical system in each of the terminals 30. The terminal 30 includes, for example, a computer 60.

The computer 60 includes a CPU 61 that controls processing of the terminal 30, a ROM 62 that stores a terminal program for causing the computer 60 to function as the terminal 30, a RAM 63 that is used as a temporary operation region of the CPU 61, a nonvolatile memory 64, and an I/O 65. The CPU 61, the ROM 62, the RAM 63, the nonvolatile memory 64, and the I/O 65 are connected to one another via a bus 66.

For example, a communication unit 67, a UI unit 68, and a global positioning system (GPS) unit 69 are connected to the I/O 65.

Functions of the communication unit 67 and the UI unit 68 are the same as the functions of the communication unit 47 and the UI unit 48 in the reception device 10. Thus, explanation for the functions of the communication unit 67 and the UI unit 68 will be omitted.

The GPS unit 69 measures, based on information transmitted from a satellite travelling around the orbit of the earth, positional information of the terminal 30, that is, the longitude and latitude of the location of the terminal 30.

There is no constraint on the type of units connected to the I/O 45 of the reception device 10, the I/O 55 of the server 20, and the I/O 65 of the terminal 30. Other units may be connected to the I/O 45, the I/O 55, and the I/O 65 when necessary. For example, to read a counter ID represented by a bar code, a camera unit is connected to the I/O 65 of the terminal 30.

Next, a method in which the server 20 sets priority levels for the terminals 30 will be described.

Figure 7:
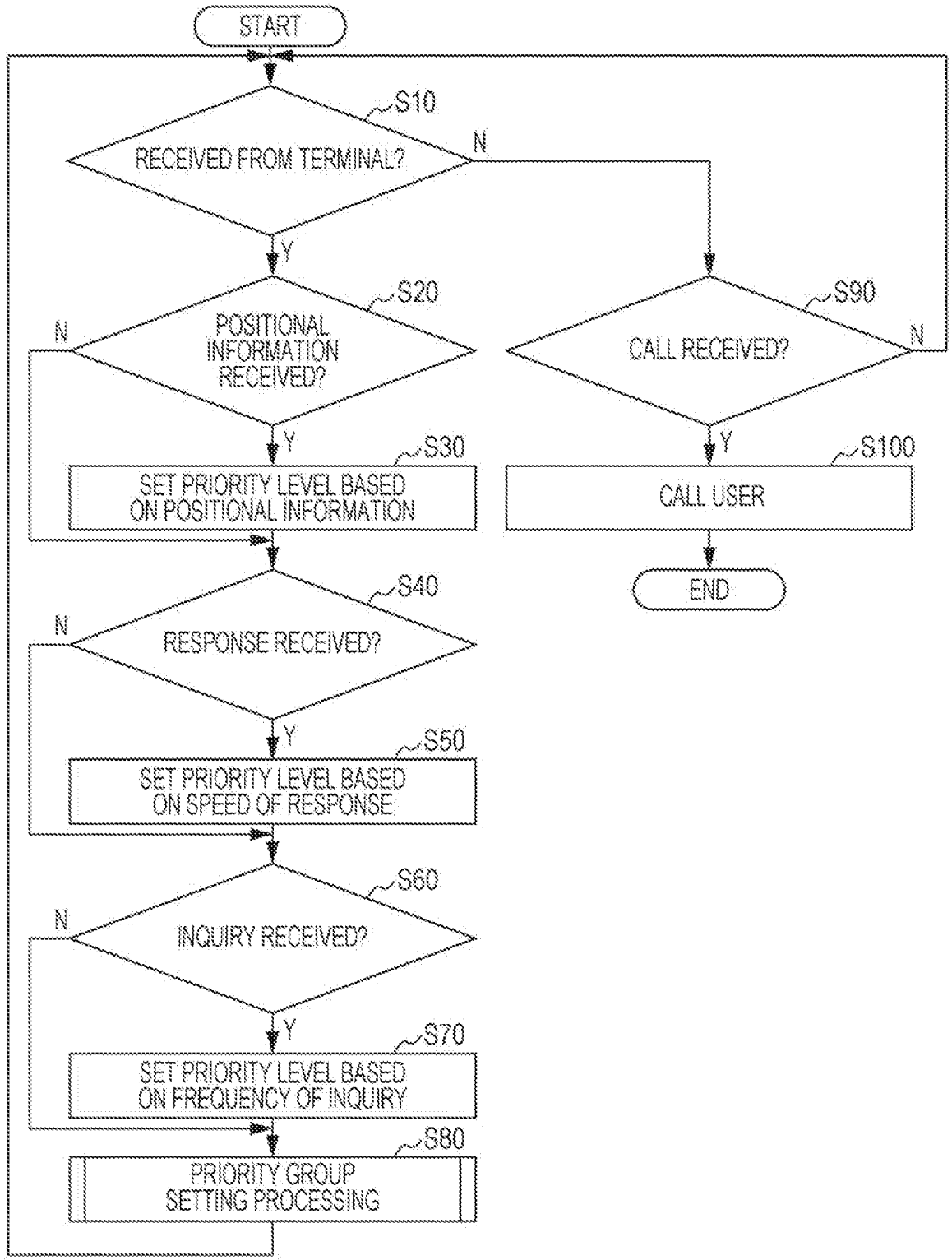
FIG. 7 is a flowchart illustrating an example of the flow of a priority level setting process.

FIG. 7 is a flowchart illustrating an example of the flow of a priority level setting process performed by the CPU 51 of the server 20 in the case where the server 20 registers identification IDs of a plurality of terminals 30 for a counter ID issued by the reception device 10. An information processing program that defines the priority level setting process is stored in advance in, for example, the ROM 52 of the server 20. The CPU 51 of the server 20 reads the information processing program stored in the ROM 52 to perform the priority level setting process. The CPU 51 performs the priority level setting process illustrated in FIG. 7 for each counter ID registered for a queue. For example, attention is paid to a counter ID, and an example in which priority levels are set for terminals 30 registered for the counter ID will be explained. Unless otherwise specified, terminals 30 represented by identification IDs registered for the counter ID are located within a group range. That is, users of the terminals 30 form a group in which the users act together.

In step S10, the CPU 51 determines whether or not information has been received from a terminal 30. In the case where information has been received from a terminal 30, the process proceeds to step S20.

In step S20, the CPU 51 determines whether or not the information received in step S10 is positional information of the terminal 30. In the case where the received information is positional information of the terminal 30, the process proceeds to step S30.

In step S30, the CPU 51 sets the priority level for the terminal 30 based on the positional information.

The priority level of the terminal 30 is set according to the degree of interest in a service by the user who is using the terminal 30. As described above, users of a plurality of terminals 30 that are registered for the same counter ID may include a user who will not actually use a service, such as, for example, a parent who intends to make sure that his/her child has safely completed a reception process for use of the service and has used the service. Furthermore, in the case where users included in a group act together, even a user who wishes to actually use a service (called a "user concerned") may be a user who supposes that somebody in the group will check transmission information from the server 20 and thus does not initiatively check the transmission information from the server 20 (called a "following user").

In the case where a notification regarding a service is transmitted preferentially to a terminal 30 that is being used by the user mentioned above, the notification may be not welcomed by the user who will not actually use the service, and the user may not check transmission information.

Thus, the CPU 51 estimates the degree of interest in a service in accordance with a reaction by a user who is using each of the terminals 30 registered for the same counter ID, and sets a higher priority level for a terminal 30 being used by a user exhibiting a higher degree of interest.

A user who will actually use a service at a shop tends to exhibit a high degree of interest in the service. Because the user who will actually use the service needs to move to the shop, the user is often located near the shop. Therefore, the CPU 51 may measure the distance from the terminal 30 to the shop on the basis of positional information of the terminal 30 and set a higher priority level for a terminal 30 that is located closer to the shop. For example, the reception device 10 may notify the server 20 of positional information of a shop, along with a request for a counter ID, and the positional information of the shop may be stored in the nonvolatile memory 54 of the server 20. The priority level of each terminal 30 is managed by the management table 4.

The CPU 51 may measure the straight line distance between a shop to a terminal 30. However, a straight line distance is different from an actual travel distance. Thus, desirably, map data is stored in the nonvolatile memory 54, so that a distance along roads where vehicles are able to travel may be measured.

A user who will not use a service may happen to be located closer to a shop than a user concerned is. However, the user who will not use the service does not need to move to the shop, and thus will not move to the shop. Therefore, the CPU 51 may store, in a chronological order, positional information received from terminals 30 in the nonvolatile memory 54, determine a terminal 30 approaching the shop to be a terminal being used by a user concerned, and set a higher priority level for the terminal 30 approaching the shop than the priority level for a terminal 30 staying in the same position or moving away from the shop.

Furthermore, a user tends to start to move to a shop after checking transmission information indicating, for example, the number of people who are waiting in the queue for a service, received from the server 20. In contrast, a following user tends to start to move after another user in a group including the following user starts to move to a shop. Thus, the following user starts to move later than the other user does.

Thus, the CPU 51 measures the time required for the terminal 30 to start to move after transmission information is transmitted. It is presumed that a terminal 30 that requires a shorter time to start to move, that is, a terminal 30 being used by a user who reacts to transmission information more quickly, is being used by a user who exhibits a higher degree of interest in a service. Thus, the CPU 51 may set a higher priority level for a terminal 30 that requires a shorter time to start to move.

In contrast, in the case where it is determined in the determination processing of step S20 that the received information is not positional information of the terminal 30, the process proceeds to step S40, without performing the processing of step S30.

In step S40, the CPU 51 determines whether or not the information received in step S10 is a response to the transmission information transmitted to the terminal 30. In the case where the received information is a response, the process proceeds to step S50.

As explained above in step S30, a user who exhibits a higher degree of interest in the service reacts more quickly to the transmission information transmitted from the server 20. Thus, in step S50, the CPU 51 measures the speed of the reaction by the user to the transmission information based on the response, and sets a higher priority level for a terminal 30 being used by a user who reacts more quickly to the transmission information.

Specifically, the CPU 51 measures, as the speed of a reaction by the user, a response time that is required from transmission of transmission information to the terminal 30 to reception of a response to the transmission information from the terminal 30 that has received the transmission information. In this case, as the response, for example, a response indicating that the user has checked the transmission information is used. The response is not necessarily, for example, intentionally transmitted to the server 20 by a user's operation on the UI unit 68 of the terminal 30. For example, a read receipt that is automatically transmitted to the server 20 from the terminal 30 only by displaying contents of transmission information on the UI unit 68 of the terminal 30 without any instruction from the user is also included in the response.

In contrast, in the case where it is determined in the determination processing of step S40 that the received information is not a response to the transmission information, the process proceeds to step S60 without performing the processing of step S50.

In step S60, the CPU 51 determines whether or not the information received in step S10 is an inquiry about the service. The inquiry about the service is information voluntarily transmitted from the terminal 30 to the server 20, independently of the transmission information. The inquiry about the service may be, for example, an inquiry about the number of people who are waiting in the queue for the service or an inquiry about the waiting time.

In the case where the received information is an inquiry about the service, the process proceeds to step S70.

A user who is using a terminal 30 registered for a counter ID may not check contents of transmission information but may care about when the service starts for the user and frequently make an inquiry with the server 20 about the waiting time until the start of the service for the user. The terminal 30 being used by such a user does not transmit a response to the transmission information to the server 20. Thus, when the priority level of the terminal 30 is set based on the speed of a reaction by the user to the transmission information, the priority level set for the user is lower than other terminals 30. However, the action of frequently making an inquiry with the server 20 about the waiting time until the start of the service for the user represents a high degree of interest in the service. Thus, in step S70, the CPU 51 regards the reception frequency of an inquiry about the service from the terminal 30 as an example of a reaction by the user, and sets a higher priority level for a terminal 30 with a higher reception frequency of an inquiry about the service.

After the processing of step S70 or in the case where it is determined in the determination processing of step S60 that the received information is not an inquiry about the service, the process proceeds to step S80.

In step S80, the CPU 51 performs priority group setting processing for categorizing the terminals 30 into priority groups according to the set priority levels of the terminals 30. The details of the priority group setting processing will be described later.

After the priority group setting processing ends, the process returns to step S10 to be ready for reception of next information from the terminal 30.

In the case where it is determined in the determination processing of step S10 that no information has been received from the terminal 30, the process proceeds to step S90.

In step S90, the CPU 51 determines whether or not a call for a user has been received from the reception device 10. In a state in which a call for a user has not been received, a call for a user has not been performed for the terminal 30. Thus, positional information, a response to transmission information, and an inquiry may be transmitted from the terminal 30 to the server 20. Therefore, the CPU 51 returns to step S10 to be ready for reception of information from the terminal 30.

That is, the CPU 51 updates the priority levels of the terminals 30 registered for the counter ID until the user of any one of the terminals 30 registered for the counter ID has received the service, and updates priority groups to which the terminals 30 belongs on the basis of the updated priority levels of the terminals 30.

In contrast, in the case where it is determined in the determination processing of step S90 that a call for a user has been received from the reception device 10, the process proceeds to step S100.

In step S100, the CPU 51 performs a call for a user to each of the terminals 30 included in a priority group to which the terminal 30 with the highest priority level belongs, and then ends the priority level setting process illustrated in FIG. 7. Each of the terminals 30 included in the priority group to which the terminal 30 with the highest priority level belongs is an example of a terminal 30 concerned.

In the priority level setting process illustrated in FIG. 7, every time that information indicating the degree of interest by the user is received from the terminal 30, the priority level of the terminal 30 and the priority group to which the terminal 30 belongs are updated. However, the priority level of the terminal 30 and the priority group to which the terminal 30 belongs may be periodically updated, for example, every five minutes.

Furthermore, in the priority level setting process illustrated in FIG. 7, the example in which positional information of the terminal 30 is not notified to the shop is described. However, the positional information of the terminal 30 registered for the counter ID issued from the reception device 10 at the shop may be notified to a management terminal of the shop, which is not illustrated in FIG. 1, via the communication line 2. In this case, at the shop that receives the positional information of the terminal 30 via the management terminal, the location of the user who is waiting for provision of the service may be obtained. Thus, for example, in the case where a user who is waiting in an earlier turn is located farther away from the shop than a user who is waiting in a later turn is, the user who is waiting in the later turn is called earlier, so that the rotation of customers at the shop and service improvement may be increased.

However, the location of users has an aspect of personal information, and in terms of privacy of users, not detailed positional information but rough positional information is preferably transmitted to the management terminal. Furthermore, the server 20 may transmit, instead of the longitude and latitude of the location of a user, the distance from a shop to a user, to the management terminal.

Furthermore, the server 20 may restrict positional information to be transmitted to the management terminal. For example, the server 20 may transmit positional information of only users who are located in a predetermined distance from a shop to the management terminal. Furthermore, the server 20 may transmit positional information of only terminals 30 included in a priority group to which the terminal 30 with the highest priority level belongs, that is, users who are using the terminals 30 concerned to the management terminal.

In the priority level setting process illustrated in FIG. 7, the example in which positional information is received from the terminal 30 is explained. However, positional information of the terminal 30 may be received from the reception device 10.

For example, an access point of a public wireless local area network (LAN) is set for the reception device 10 installed in the shop. In this case, when the user approaches the shop, the terminal 30 being used by the user is connected to the access point, so that the user is able to use the Internet in an area close to the shop. Thus, by using the fact that the radio field intensity of the terminal 30 detected at the access point increases as the terminal 30 approaches the shop, the reception device 10 may measure the distance from the terminal 30 to the shop on the basis of the radio field intensity of the terminal 30 connected to the access point. The reception device 10 transmits an identification ID of each terminal 30 acquired at the access point and the measured distance in association with each other to the server 20, and the server 20 is thus able to obtain positional information of the terminal 30. In this case, the terminal 30 is not necessarily provided with the display unit 69.

Obviously, the reception device 10 may transmit the identification ID and radio field intensity of the terminal 30 in association with each other to the server 20, so that the distance from the terminal 30 represented by the identification ID to the shop may be measured on the basis of the radio field intensity received at the server 20.

The access point may be installed inside the shop. In this case, the reception device 10 may receive the identification ID and the radio field intensity of the terminal 30 connected to the access point from the access point installed inside the shop and transmit the received identification ID and radio field intensity to the server 20.

Next, the priority group setting processing performed in step S80 of FIG. 7 will be described in detail.

Figure 8:
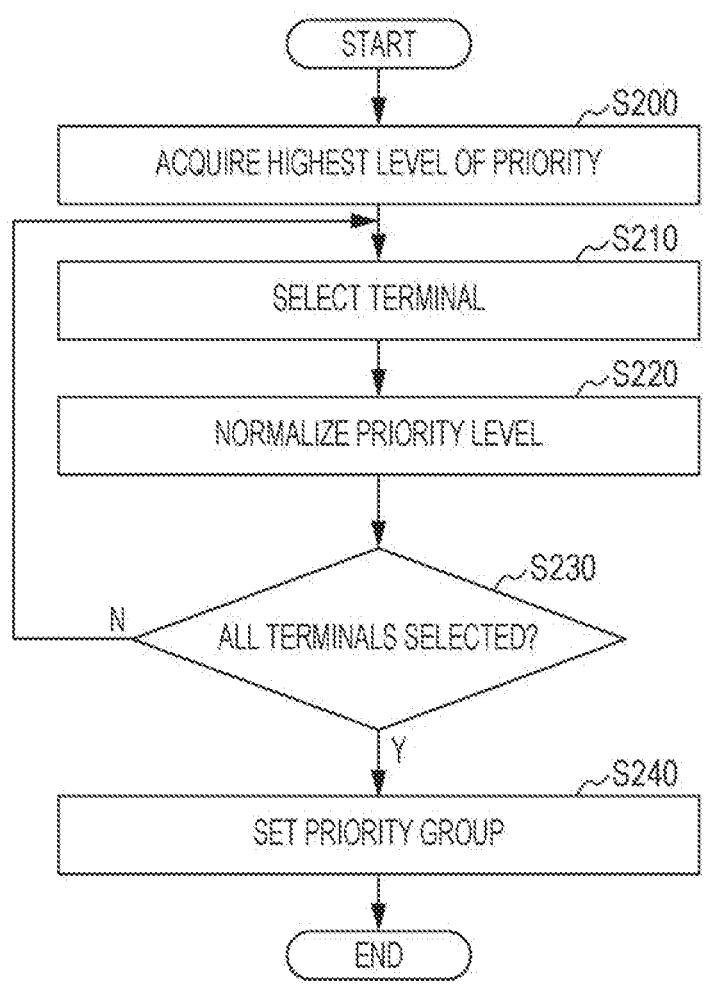
FIG. 8 is a flowchart illustrating an example of the flow of a priority group setting process.

FIG. 8 is a flowchart illustrating an example of the flow of the priority group setting processing performed in step S80 of FIG. 7.

In step S200, the CPU 51 refers to the management table 4 to acquire the highest priority level out of priority levels of the terminals 30 registered for the counter ID.

In step S210, the CPU 51 selects one of the terminals 30 registered for the same counter ID as that in step S200.

In step S220, the CPU 51 divides the priority level of the terminal 30 selected in step S210 by the priority level acquired in step S200 and performs normalization such that the maximum value of the priority level is set to "1".

In step S230, the CPU 51 determines whether or not all the terminals 30 registered for the same counter ID as that in step S200 have been selected in step S210. In the case where there is an unselected terminal 30, the process returns to step S210, and the CPU 51 selects one of the unselected terminals 30.

By repeatedly performing the processing of steps S210 to S230 until all the terminals 30 registered for the counter ID have been selected, normalized priority level is set for each of the terminals 30 registered for the counter ID.

In the case where it is determined in the determination processing of step S230 that all the terminals 30 registered for the counter ID have been selected, the process proceeds to step S240.

In step S240, the CPU 51 categorizes the terminals 30 registered for the counter ID into priority groups in accordance with the normalized priority levels.

For example, terminals 30 with the normalized priority level of 0.0 or more and less than 0.2 are categorized into a priority group C, terminals 30 with the normalized priority level of 0.2 or more and less than 0.8 are categorized into a priority group B, and terminals 30 with the normalized priority level of 0.8 and more and 1.0 and less are categorized into a priority group A. In this case, by normalizing the priority levels of the terminals 30 managed in the management table 4 illustrated in FIG. 3 and categorizing the terminals 30 into priority groups, terminals 30 with the identification IDs "1" and "3" are categorized into the priority group A, and a terminal 30 with the identification ID "2" is categorized into the priority group B. Categorization of the priority groups mentioned above is merely an example. The number of priority groups is not necessarily three. The number of priority groups may be two or more.

The users of the terminals 30 categorized into the priority group A exhibit a higher degree of interest in the service to be provided than the users of the terminals 30 categorized into the other priority group. Thus, the CPU 51 identifies the terminals 30 included in the priority group representing the highest category out of the plurality of priority groups prepared according to the degree of priority level, that is, the terminals 30 included in the priority group A, as the terminals 30 concerned.

Then, the CPU 51 changes contents of transmission information to be transmitted to the terminals 30 in accordance with the priority groups to which the terminals 30 belong. For example, the users who are using the terminals 30 belonging to the priority group A are considered to be users concerned. Thus, the CPU 51 transmits a notification regarding the service including a call for a user to the terminals 30 belonging to the priority group A.

The users who are using the terminals 30 belonging to the priority group B may not be users concerned. However, for example, the users who are using the terminals 30 belonging to the priority group B are considered to be users who support a user concerned to receive the service. Thus, for example, the CPU 51 transmits a notification regarding the service except for a call for a user to the terminals 30 belonging to the priority group B.

The users who are using the terminals 30 belonging to the priority group C are considered not to be users concerned but considered to be, for example, users who only wish to know the status of a user concerned who will use the service. Thus, for example, the CPU 51 transmits only a notification indicating the status of a user concerned to the terminals 30 belonging to the priority group C.

There is no constraint on association between a priority group and contents of information to be notified to terminals 30 included in the priority group. For example, no transmission information may be transmitted from the server 20 to the terminals 30 belonging to the priority group C. A priority group to which a terminal 30 belongs may not be fixed. A priority group to which a terminal 30 belongs may be updated according to a reaction by the user of the terminal 30. Thus, a priority group to which the terminal 30 belongs may be changed. In the case where a priority group to which a terminal 30 belongs is changed, the CPU 51 may notify the terminal 30 that the priority group to which the terminal 30 belongs has been changed.

Figure 9:
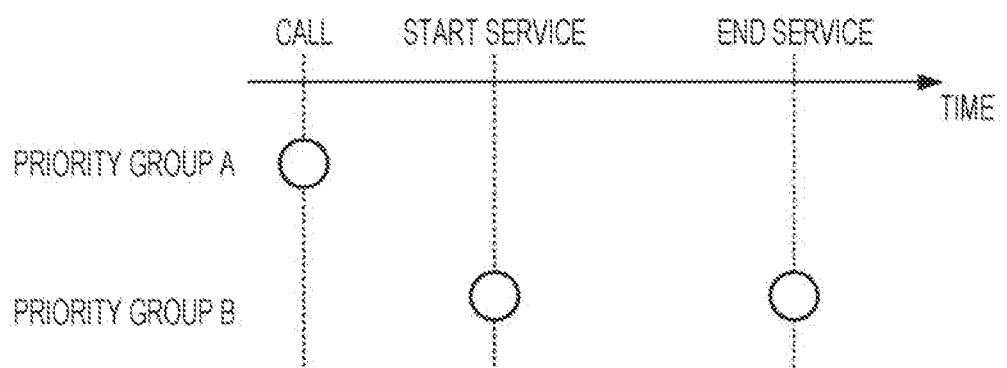
FIG. 9 is a diagram for explaining an example in which contents of transmission information to be transmitted to a terminal are changed in accordance with a priority group.

FIG. 9 is a diagram illustrating an example in which contents of transmission information to be transmitted to a terminal 30 change according to a priority group to which the terminal 30 belongs. In this example, a state in which a terminal 30 that is located beyond a group range is also registered for a counter ID will be explained. That is, users in a group act individually.

As illustrated in FIG. 9, the CPU 51 performs control such that a call for a user is performed to a terminal 30 belonging to the priority group A but not to a terminal 30 belonging to the priority group B. Meanwhile, the CPU 51 performs control such that at a point in time when a service for a user concerned starts and at a point in time when the service for the user concerned ends, a service start notification and a service end notification are transmitted a terminal 30 belonging to the priority group, respectively, but not to a terminal 30 belonging to the priority group A.

Accordingly, for example, after receiving the service end notification, a user who is using a terminal 30 belonging to the priority group B is easily able to provide support such as picking up a user concerned who has used the service at a shop.

Prior to ending of the service for the user concerned, the server 20 may transmit a prior notification notifying that the service for the user concerned will soon be completed to the terminal 30 belonging to the priority group B so that the user who will pick up the user concerned is able to arrive the shop in time for the ending of the service. A set value indicating how many minutes before the ending of the service a prior notification is to be transmitted, is stored in advance in the nonvolatile memory 54, and the user is able to set the set value on his/her terminal 30. In this case, for example, the CPU 51 may estimate the service ending time on the basis of basic statistics represented by an average value of past performance times required from start to ending of the service.

Furthermore, the CPU 51 may not transmit a prior notification in accordance with a set value of the prior notification but may determine a timing for transmitting a prior notification in accordance with positional information of the terminal 30 belonging to the priority group B. Specifically, a longer time is required for a user whose location, which is represented by positional information of a terminal 30, is farther away from a shop to move to the shop. Thus, the CPU 51 may transmit a prior notification earlier for a case where a user who is using a terminal 30 belonging to the priority group B is farther away from the shop. In this case, as the distance from the user who is using the terminal 30 belonging to the priority group B to the shop, instead of a straight line distance, a distance along roads where vehicles are able to travel is preferably used. In the case where a plurality of terminals 30 belong to the priority group B, the CPU 51 may adjust the timing for transmitting a prior notification for each terminal 30 in accordance with the distance from a user who is using the terminal 30 to the shop and transmit the prior notification at the adjusted timing.

In step S90 in FIG. 7, the CPU 51 determines whether or not a call for a user has been received from the reception device 10. However, the CPU 51 may determine whether or not a service start notification has been received from the reception device 10. In this case, the priority levels of the terminals 30 registered for the counter ID are updated until any user in a group has received the service, and terminals 30 concerned are also updated.

In contrast, the CPU 51 may treat a terminal 30 that is categorized into a priority group different from the priority group A (called a "terminal 30 not concerned") as a terminal 30 concerned, according to the situation.

For example, in the case where positional information of a terminal 30 identified as a terminal 30 not concerned according to the priority level indicates a location inside a shop, the probability that the user who is using the terminal 30 will be a user concerned who will actually receive a service is higher than the probability that a user who is away from the shop will be a user concerned who will actually receive the service. Thus, the CPU 51 may treat a terminal 30 not concerned whose positional information indicates a location inside a shop as a terminal 30 concerned.

Furthermore, in the case where a plurality of users act together, a situation in which a specific user as a representative responds to transmission information transmitted from the server 20 is likely to occur. In such a case, even if all the plurality of users are users concerned who wish to use a service, high priority level is set for only the terminal 30 being used by the representative, and the priority levels of the terminals 30 being used by the other users are lower than the priority level of the terminal 30 being used by the representative. Thus, a call for a user is not performed to the terminals 30 being used by the other users. If the representative does not notice the call for a user, none of the other users who act together with the representative notices the call for a user.

Therefore, in the case where the CPU 51 refers to positional information of terminals 30 and a terminal 30 not concerned is located within a predetermined range from the terminal 30 concerned, the terminal 30 not concerned may also be treated as a terminal 30 concerned. The predetermined range is set, for example, to a group range.

As described above, in the case where a plurality of users act together, the CPU 51 may regard each of the terminals 30 being used by the users who act together as being categorized into a priority group to which the terminal 30 with the highest priority level among the terminals 30 being used by the users who act together belongs.

Furthermore, for example, in the case where the CPU 51 transmits information only to terminals 30 concerned but none of the terminals 30 concerned responds to the transmitted information, none of the users of the terminals 30 concerned may notice the transmitted information. Thus, the CPU 51 may regard the terminals 30 belonging to a priority group with a priority level lower than the priority group to which the terminals 30 concerned belong as terminals 30 concerned and transmit the information transmitted only to the terminals 30 concerned to the terminals 30 belonging to the priority level lower than the priority group to which the terminals 30 concerned belong again.

Specifically, in the case where none of the terminals 30 belonging to the priority group A responds, the CPU 51 transmits the information transmitted only to the terminals 30 concerned to terminals 30 belonging to the priority group B. Then, in the case where none of the terminals 30 belonging to the priority group B responds, the CPU 51 transmits the information transmitted only to the terminals 30 concerned to terminals 30 belonging to the priority group C.

As described above, the CPU 51 may transmit, in order from a specific priority group until any terminal 30 responds, information transmitted only to the specific priority group to terminals 30 belonging to a priority group with a lower priority level.

In the case where a terminal 30 is regarded as a terminal 30 belonging to a priority group different from a priority group set based on the actual priority level, the CPU 51 notifies the terminal 30 that a priority group is temporarily adjusted.

Then, the priority group setting process illustrated in FIG. 8, that is, the processing of step S80 in FIG. 7, ends.

In the priority group setting process illustrated in FIG. 8, the example in which the server 20 normalizes priority levels of the terminals 30 and categorizes the terminals 30 into priority groups is described. However, the server 20 does not necessarily normalize the priority levels of the terminals 30 and then categorize the terminals 30 into priority groups. For example, the terminals 30 may be categorized into priority groups in accordance with fixed categorization rules of categorizing terminals 30 with a priority level before normalization of 0.0 or more and less than 1.0 into the priority group C, categorizing terminals 30 with a priority level before normalization of 1.0 or more and less than 3.0 into the priority group B, and categorizing terminals 30 with a priority level before normalization of 3.0 into the priority group A.

However, in the case where categorization is performed without normalizing the priority levels of the terminals 30, for example, in the case where the priority levels of all the terminals 30 are less than 3.0, no terminal 30 is categorized into the priority group A. That is, because there is no terminal 30 concerned, it may be difficult for the CPU 51 to determine which one of the terminals 30 registered for a counter ID a notification regarding a service is to be preferentially transmitted to.

In contrast, in the case where the priority levels of the terminals 30 are normalized and the terminals 30 are then categorized into priority groups, a terminal 30 with the highest priority level among the terminals 30 registered for the counter ID is categorized into the priority group A. Thus, at least one terminal 30 is identified as a terminal 30 concerned.

In the case where categorization is performed without normalizing the priority levels of the terminals 30 and there is no terminal 30 categorized into the priority group A, if there is a terminal 30 categorized into a priority group with a next higher category, that is, the priority group B, the CPU 51 may regard the terminal 30 as a terminal 30 concerned and preferentially transmit a notification regarding a service to the terminal 30. As described above, in the case where the terminals 30 are categorized into priority groups without priority levels of the terminals 30 being normalized, the CPU 51 may identify a terminal 30 included in a priority group to which a terminal 30 for which the highest priority level is set belongs, out of priority groups each including at least one terminal 30, as a terminal 30 concerned.

The server 20 may be established using a cloud service. In the case where a cloud service is used for the server 20, because an enterprise different from a provider who provides a service manages the server 20, security measures are to be taken. Thus, in order to avoid information leakage due to unauthorized access to the server 20 or the like, it is desirable that personal information to identify a user is stored in a management terminal, which is not illustrated in FIG. 1, installed at a shop and that the personal information is not stored in the server 20. Then, based on a counter ID and an identification ID stored in the management terminal and the server 20 as a key, the personal information stored in the management terminal is associated with information regarding a user collected at the server 20, and processing for using the personal information is performed. The processing for using personal information represents, for example, processing regarding issuance of an invoice for use of a service, giving points for use of the service, and the like.

Figure 10:
FIG. 10 is a diagram illustrating another example of the management table.

FIG. 10 is a diagram illustrating an example of the management table 4 stored in the nonvolatile memory 54 of the server 20. In the management table 4 illustrated in FIG. 10, a location column and a status column are added to the contents of the management table 4 illustrated in FIG. 3. In the location column, the current location of a user who is using a terminal 30, which is represented by positional information collected from the terminal 30, is set. In the status column, the movement status of a user estimated from positional information is set.

In the case where the absolute positional information represented by longitude and latitude is set in the location column of the management table 4, if the management table 4 is leaked to the outside, a user may be identified. Thus, it is desirable that relative positional information represented by a distance from a shop is set in the location column of the management table 4.

Figure 11:
FIG. 11 is a diagram illustrating an example of a customer table.

FIG. 11 is a diagram illustrating an example of a customer table 6 stored in a management terminal, which is not illustrated in FIG. 1. The customer table 6 includes an identification ID column, a name column, an address column, a telephone number column, and a counter ID column. Contents in these columns are associated with one another in the row direction.

In the name column, the name of a user represented by an identification ID is set. In the address column, the address of a user represented by an identification ID is set. In the telephone number column, the telephone number of a user represented by an identification ID is set. Furthermore, in the counter ID column of the customer table 6, a counter ID read with a terminal 30 by a user represented by an identification ID is set. In order for a user to use the information processing system 1, information necessary to use the information processing system 1 is registered in advance, and the registered information (in the example of FIG. 11, an identification ID, a name, an address, and a telephone number) are registered in the customer table 6.

In the case where the server 20 associates a counter ID with an identification ID (FIG. 2: V3), the server 20 performs setting in the counter ID column of the customer table 6. In the case where the server 20 does not associate a counter ID with an identification ID, nothing is registered in the counter ID column of the customer table 6.

As described above, even in the case where the customer table 6 and the management table 4 are stored in the management terminal and the server 20 separately, by associating the counter ID in the customer table 6 with the counter ID in the management table 4 illustrated in FIG. 10 stored in the server 20, the management terminal is able to obtain the location and status of a user who is using each of the terminals 30 registered for the counter ID.

In contrast, for example, in the case where a service is for charge, an invoice is issued. Personal information such as the name, address, and telephone number of a user required for issuing the invoice is managed at the management terminal. Thus, even if information leakage unintentionally occurs at the server 20, protection of the personal information is achieved compared to the case where the personal information is stored in the server 20.

Exemplary embodiments of the present disclosure have been described above. However, the present disclosure is not limited to the exemplary embodiments described above. Various changes or improvements may be made to exemplary embodiments without departing from the scope of the present disclosure, and aspects to which the changes or improvements have been made are also encompassed within the technical scope of the present disclosure. For example, order of processing steps may be changed without departing from the scope of the present disclosure.

In an exemplary embodiment, an example in which the priority level setting process and the priority group setting process are implemented by software is described. However, processes equivalent to the processes represented by the flowcharts illustrated in FIGS. 7 and 8 may be implemented in, for example, an application specific integrated circuit (ASIC), a field programmable gate array (FPGA), or a programmable logic device (PLD) and may be processed by hardware. In this case, compared to the case where the priority level setting process and the priority group setting process are implemented by software, the processing speed may be increased.

As described above, the CPU 51 of the server 20 may be replaced with a dedicated processor specialized in specific processing, such as the ASIC, the FPGA, the PLD, a graphic processing unit (GPU), or a floating point unit (FPU).

Furthermore, operation of the server 20 according to an exemplary embodiment may not be implemented by a single CPU 51 but may be implemented by a plurality of CPUs 51. Moreover, operation of the server 20 according to an exemplary embodiment may be implemented by CPUs 51 included in a plurality of computers 50 in collaboration which are located physically apart from each other.

In an exemplary embodiment described above, the information processing program is installed in the ROM 52. However, the present disclosure is not limited to this. An information processing program according to an exemplary embodiment may be recorded in a recording medium readable by the computer 50 and provided. For example, the information processing program may be recorded in an optical disk such as a compact disc (CD)-ROM or a digital versatile disc (DVD)-ROM and provided. Furthermore, the information processing program may be recorded in a portable semiconductor memory such as a universal serial bus (USB) or a memory card and provided.

Furthermore, the server 20 may acquire the information processing program through the communication unit 57 from an external apparatus connected to the communication line 2.

In the embodiments above, the term "processor" refers to hardware in a broad sense. Examples of the processor include general processors (e.g., CPU: Central Processing Unit), and dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
associate a plurality of terminals with a service, the plurality of terminals being registered for the service and located within a predetermined range,
set, based on use statuses of the plurality of terminals located within the predetermined range, priority levels for the plurality of terminals, and
transmit a notification regarding the service to a terminal with the highest priority level, wherein
the setting of the priority levels includes
measuring a speed of reaction by a user of a respective terminal of the plurality of terminals, to transmission information that has been transmitted from the processor to the respective terminal,
the speed of reaction being measured including an amount of time elapsed from when the transmission information has been transmitted by the processor to when the user's reaction to the transmission information is received by the processor, and
setting a higher priority level for a terminal that is associated with a quicker speed of reaction indicated by a less amount of the time elapsed, than a terminal associated with a slower speed of reaction indicated by a more amount of the time elapsed.

2. The information processing apparatus according to claim 1, wherein the processor
sets, for each of the plurality of terminals, the priority level for the terminal for the service, based on a reaction by a user who is using the terminal, the reaction being notified from the terminal, and
identifies, based on the set priority level of the terminal for the service, a terminal concerned that receives the notification regarding the service from among the plurality of terminals.

3. The information processing apparatus according to claim 2, wherein the processor
acquires positional information of a location of each of the plurality of terminals, and measures the reaction by the user who is using the terminal, based on a distance from the terminal being used by the user to a location where the service is provided, and
sets a higher priority level for a terminal that is located closer to the location where the service is provided.

4. The information processing apparatus according to claim 3, wherein the processor sets a higher priority level for a terminal that is determined to be approaching the location where the service is provided, by being positioned at a location closer to the location where the service is provided than a previous location represented by previously acquired positional information of the terminal.

5. The information processing apparatus according to claim 3, wherein the user's reaction to the transmission information is a read receipt transmitted from the terminal when the user causes contents of the transmission information to be displayed on the respective terminal.

6. The information processing apparatus according to claim 2, wherein the processor measures the reaction by the user in accordance with a reception frequency of an inquiry about the service received from the terminal.

7. The information processing apparatus according to claim 2, wherein the processor
categorizes the plurality of terminals into groups according to the set priority levels, and
regards each terminal included in a group including the terminal with the highest priority level as a terminal concerned.

8. The information processing apparatus according to claim 7, wherein the processor updates the priority levels of the plurality of terminals until a user who is using any one of the plurality of terminals receives the service, and updates a terminal regarded as the terminal concerned.

9. The information processing apparatus according to claim 8, wherein in a case where a different terminal that is different from the terminal concerned is present within a predetermined range from a location of the terminal identified as the terminal concerned, the processor also identifies the different terminal as the terminal concerned.

10. The information processing apparatus according to claim 2, wherein the processor makes contents of information to be transmitted different between the terminal concerned and a terminal different from the terminal concerned.

11. The information processing apparatus according to claim 10, wherein in a case where no reaction is given by a user of the terminal concerned, the processor transmits information of same contents as the information transmitted to the terminal concerned to the terminal different from the terminal concerned.

12. The information processing apparatus according to claim 1, wherein the user's reaction to the transmission information is a read receipt transmitted from the terminal when the user causes contents of the transmission information to be displayed on the respective terminal.

13. The information processing apparatus according to claim 1, wherein the processor
acquires positional information of a location of each of the plurality of terminals, and
measures, as the speed of the reaction by the user to the transmission information, a time required for the respective terminal that has received the transmission information to start to move after the transmission of the transmission information to the respective terminal.

14. A non-transitory computer readable medium storing a program causing a computer to execute a process for information processing, the process comprising:
associating a plurality of terminals with a service, the plurality of terminals being registered for the service and located within a predetermined range,
setting, based on use statuses of the plurality of terminals located within the predetermined range, priority levels for the plurality of terminals, and
transmitting a notification regarding the service to a terminal with the highest priority level, wherein
the setting of the priority levels includes
measuring a speed of reaction by a user of a respective terminal of the plurality of terminals, to transmission information that has been transmitted from the computer to the respective terminal,
the speed of reaction being measured including an amount of time elapsed from when the transmission information has been transmitted by the computer to when the user's reaction to the transmission information is received by the computer, and
setting a higher priority level for a terminal that is associated with a quicker speed of reaction indicated by a less amount of the time elapsed, than a terminal associated with a slower speed of reaction indicated by a more amount of the time elapsed.

\* \* \* \* \*